US008944417B2

(12) United States Patent
Ausner et al.

(10) Patent No.: US 8,944,417 B2
(45) Date of Patent: *Feb. 3, 2015

(54) PACKING LAYER FOR A STRUCTURED PACKING

(75) Inventors: Ilja Ausner, Öhningen (DE); Markus Duss, Winterthur (CH)

(73) Assignee: Sulzer Chemtech AG, Winterthur (CH)

(*) Notice: Subject to any disclaimer, the term of this patent is extended or adjusted under 35 U.S.C. 154(b) by 441 days.

This patent is subject to a terminal disclaimer.

(21) Appl. No.: 12/661,526

(22) Filed: Mar. 18, 2010

(65) Prior Publication Data

US 2010/0237519 A1  Sep. 23, 2010

(30) Foreign Application Priority Data

Mar. 18, 2009 (EP) ...................................... 09155549
Apr. 23, 2009 (EP) ...................................... 09158651

(51) Int. Cl.
  *B01J 19/32* (2006.01)

(52) U.S. Cl.
  CPC .......... *B01J 19/32* (2013.01); *B01J 2219/3221* (2013.01); *B01J 2219/32217* (2013.01); *B01J 2219/32227* (2013.01); *B01J 2219/32248* (2013.01); *B01J 2219/32255* (2013.01); *B01J 2219/32408* (2013.01); *B01J 2219/32425* (2013.01); *B01J 2219/32483* (2013.01); *Y02C 10/06* (2013.01); *Y10S 261/72* (2013.01)
  USPC .................................. 261/112.2; 261/DIG. 72

(58) Field of Classification Search
  USPC ........................ 261/112.2, DIG. 72; 422/171
  See application file for complete search history.

(56) References Cited

U.S. PATENT DOCUMENTS

| 3,260,511 | A | * | 7/1966 | Greer | 261/112.2 |
| 3,540,702 | A | * | 11/1970 | Uyama | 261/112.2 |
| 3,574,032 | A | * | 4/1971 | Norback et al. | 156/291 |
| 3,775,234 | A | * | 11/1973 | Rich | 428/183 |
| 4,344,899 | A | * | 8/1982 | Monjoie | 261/112.2 |
| 4,670,197 | A | * | 6/1987 | Stackhouse | 261/112.2 |
| 4,905,313 | A | * | 2/1990 | Stackhouse | 261/112.2 |
| 5,217,788 | A | * | 6/1993 | Rye | 428/184 |
| 5,474,832 | A | * | 12/1995 | Massey | 428/182 |
| 5,510,170 | A | * | 4/1996 | Moore | 428/184 |
| 7,491,325 | B2 | * | 2/2009 | Kulick et al. | 210/150 |
| 8,715,398 | B2 | * | 5/2014 | Ausner et al. | 95/211 |
| 8,746,660 | B2 | * | 6/2014 | Ausner et al. | 261/112.2 |
| 2005/0079111 | A1 | * | 4/2005 | Gaiser | 422/180 |
| 2011/0318244 | A1 | * | 12/2011 | Ausner et al. | 423/210 |

FOREIGN PATENT DOCUMENTS

| EP | 0 209 898 A1 * | 1/1987 |
| EP | 0 529 422 | 3/1993 |
| EP | 1 063 009 A | 12/2000 |
| EP | 1 216 752 A | 6/2002 |
| GB | 2 258 524 A | 2/1993 |

* cited by examiner

*Primary Examiner* — Duane Smith
(74) *Attorney, Agent, or Firm* — Francis C. Hand; Carella, Byrne, et al

(57) ABSTRACT

A packing layer for a structured packing which has corrugations forming open channels. Each channel includes first and second corrugation peaks bounding a first corrugation valley with each corrugation peak having an apex and the corrugation valley having a valley bottom. A spacer element is mounted on and extends along the apex of at least one corrugation peak. The spacer element has an edge which has a larger normal spacing from the valley bottom than, the spacing of the apex of the corrugation peak from the valley bottom.

16 Claims, 11 Drawing Sheets

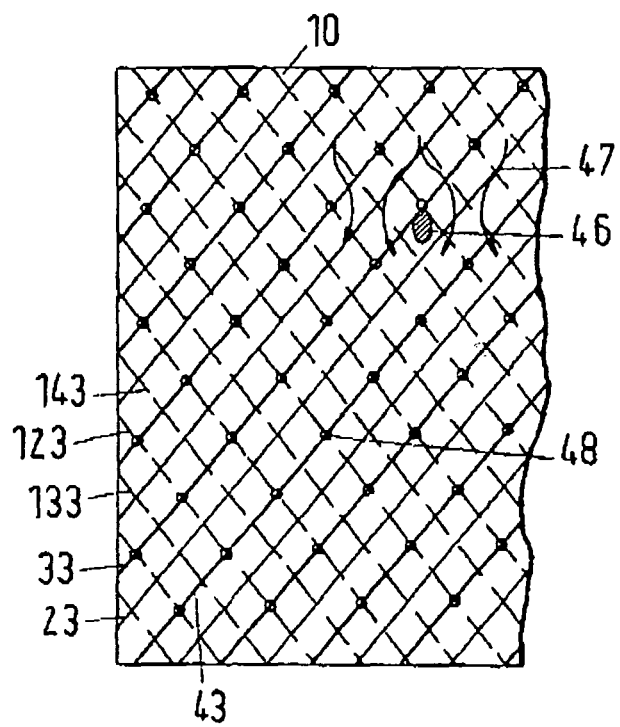

Fig.7
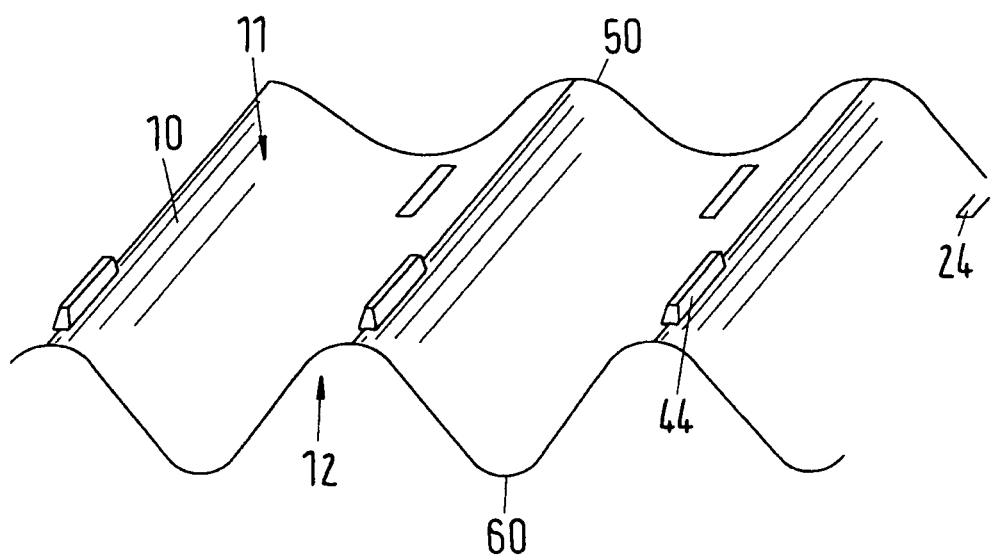
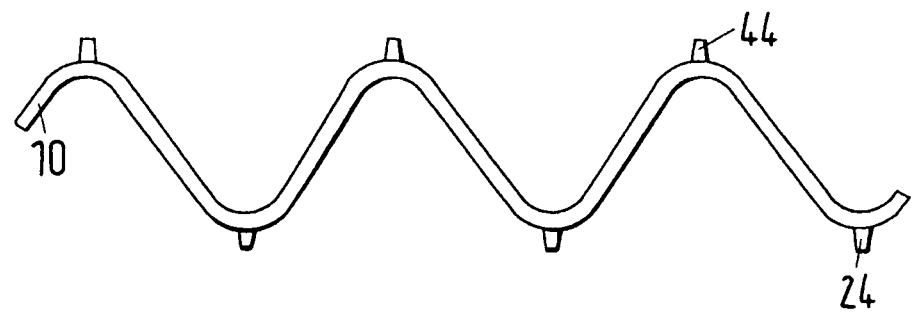

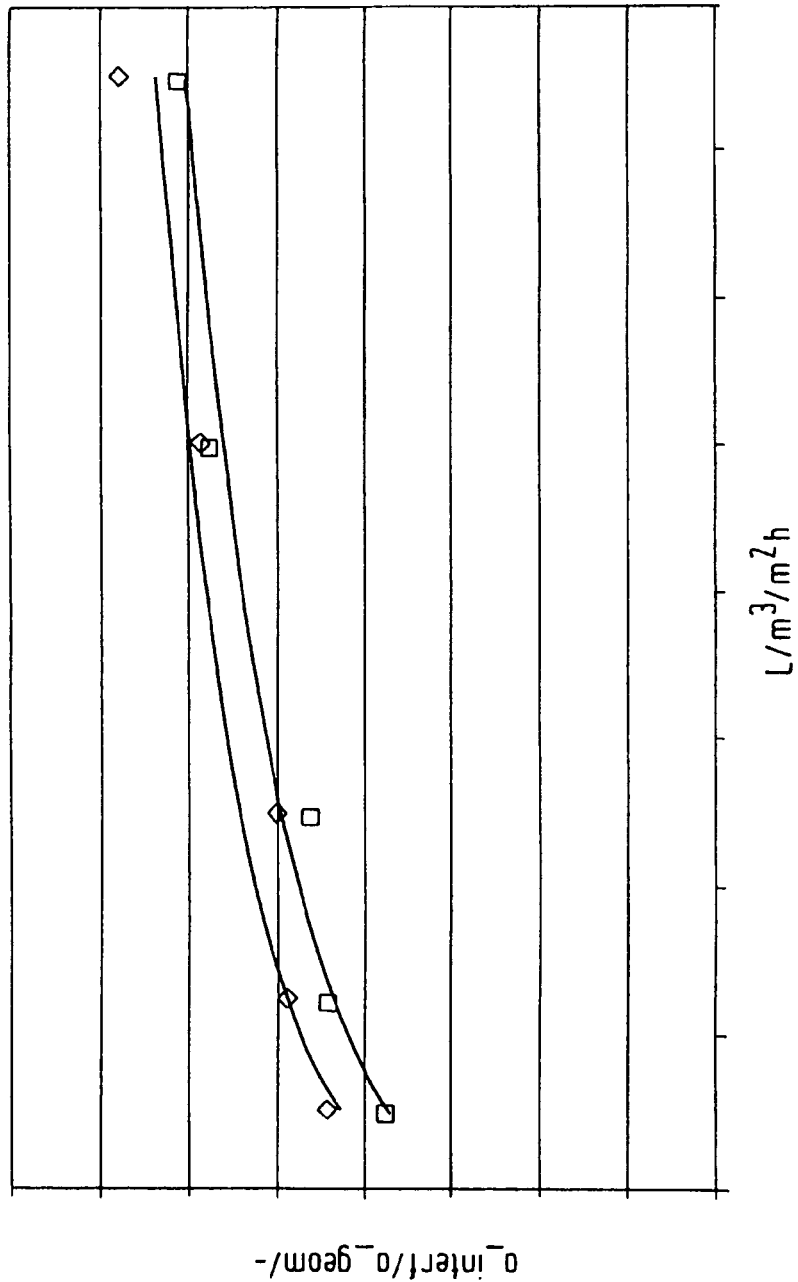

PACKING LAYER FOR A STRUCTURED PACKING

This invention relates to a structured packing and to a column which contains a structured packing. More particularly, this invention relates to a structured packing for an absorption column.

The principle of structured packings has been used for decades in absorption (cf. K. Sattler "Thermische Trennverfahren" [Thermal Separation Processes], VCH Verlag, Weinheim 1995) since the energy to be input and the construction height of the absorption column can herewith be saved.

Structured packings are made in a commercial embodiment as folded metal sheets arranged one after the other whose structure has inclined channels which continuously cross one another. These channels positively influence the flows of the gas phase and the liquid phase within the packing and facilitate the mass transfer between the phases. That is, the gas phase and liquid phase are brought into contact in the channels of the packing and the mass transfer between the phases is thus facilitated.

To increase the separating capacity of a structured packing, the surface of the structured packing is usually enlarged, which is usually achieved by a higher number of layers and/or tighter channel geometries. The total surface results by calculation as the sum of the geometrical surfaces of the packing layers. However, these measures result in an increase of the pressure drop in the structured packing. It follows from this, however, that less packing surface has to be provided for the reduction of the pressure drop, whereby the separating capacity, that is the efficiency of the packing, deteriorates. In addition, more open cross-channels can be provided. More open cross-channels means that the angle of inclination of the channels is selected to be lower with respect to the main direction of flow. This means that an optimum has to be found between the pressure drop and the best possible separating capacity in dependence on the application.

The crossing channels, however, have a high number of contact points which can have a positive effect in some applications, but also a negative effect in other applications.

In applications with liquid flows with good wetting such as in rectification processes with organic fluids, the contact points have the effect that an impacting liquid flow is divided and is deflected to the sides of the channels. The transverse distribution of the liquid is thereby amplified and the efficiency is improved. The contact points moreover have the effect that the gas flow runs primarily in the direction of the channels and not parallel to the main direction of flow, whereby the gas-side mass transfer can be improved.

Dead zones can form around the contact points, in which the liquid participates in the mass transfer to a lesser degree than the remaining liquid which is located on the structured packing. This phenomenon is already known from U.S. Pat. No. 6,378,332 B1 in which a packing for cryogenic rectification is described which is intended to reduce the occurrence of such dead zones. The solution in accordance with U.S. Pat. No. 6,378,332 B1 lies in reducing the number of contact points between the packing layers by alternately high and flat folds of each individual packing layer However, systems are looked at in this respect whose small surface tensions nevertheless result in an ideal wetting of the total surface, i.e. the zones behind the contact points are still wetted with liquid. It follows from this that the mass transfer area effectively available only differs in the ideal case by the contact surface which is required by the contact points. Consequently, only the contact points result in a loss of effectively available mass transfer area. The effectively available mass transfer area is that part of the total surface which is wetted by the less volatile fluid, in most cases a liquid.

A rectification process is thus known from U.S. Pat. No. 6,378,332 B1 in which a structured packing is used which has a cross-channel structure, that is it is made of corrugated or folded metal sheets which are placed over one another crosswise. Adjacent metal sheets contact one another along the corrugation peaks or along the edges. A more volatile liquid can flow between the folded metal sheets in counterflow to a less volatile fluid, with a mass transfer being able to take place. A process is shown in U.S. Pat. No. 6,378,332 B1 to reduce the number of contact points between two adjacent metal sheets. Provision is made for this purpose to vary the height of the corrugation peaks or of the edges such that only some of the corrugation peaks or edges of each metal sheet has the maximum height. The metal sheets thus only contact one another at maximum height along the corrugation peaks or edges.

The mass transfer is decisively influenced by the mass transfer area in liquid-controlled systems. This in particular applies when chemical reactions take place in the liquid phase. EP 0 671 963 B1 proposes for this purpose to combine the packing layers even more tightly to accommodate more packing layers per unit of volume than normally customary. The higher material consumption and the increasing pressure loss are in turn disadvantageous in this respect.

It has surprisingly now been found that packings having fewer contact points which are arranged differently and which, on the one hand, decrease the pressure loss at the gas side and, on the other hand, reduce the total surface have a positive effect on the absorption capacity in liquid-controlled systems, in particular when chemical reactions take place in the liquid phase.

Accordingly, such a packing structure will preferably be used in liquid-controlled systems and advantageously in systems for the absorption of $CO_2$ from gas flows. In this system, the mass transfer is decisively influenced by a chemical reaction in the liquid phase. This $CO_2$ arises in exhaust gases which occur, for example, in power stations. The $CO_2$ is separated from the exhaust gas flow in a downstream absorption system by means of absorption, it is compressed and subsequently stored underground, for example. A structured packing is required for the absorption which generates as little pressure drop as possible and additionally allows a high separating capacity.

It is therefore the object of the invention to provide a structured packing which has an improved stability with the same number or a lower number of contact points.

A further object of the invention is to select the arrangement of the contact points such that there is a minimal change of the mass transfer due to the contact points.

It is a further object of the invention to reduce the pressure loss within a structured packing since hereby energy to generate the gas flow can be saved, wherein the separating capacity should deviate as little as possible from the achievable optimum.

It is a further object of the invention is to provide a structured packing which has an improved stability with the same number or a lower number of contact points.

Briefly, the invention provides a structured packing formed of two packing layers that are separated by spacer elements.

The use of the spacer elements and the arrangement of contact points between the packing layers allows a maximum liquid wetting of the total surface, particularly in absorption applications.

A first packing layer for the structured packing has corrugations which form a plurality of open channels. The channels include a first corrugation valley, a first corrugation peak and a second corrugation peak, wherein the first corrugation peak and the second corrugation peak bound the first corrugation valley, wherein the first and second corrugation peaks have a first apex and a second apex. A spacer element extending in the direction of the first apex is formed on the first apex of the first corrugation peak, wherein the first corrugation valley has a valley bottom, wherein the spacer element has an edge which has a greater normal spacing from the valley bottom of the corrugation valley than the first vertex of the first corrugation peak.

In accordance with a preferred embodiment, a second spacer element is arranged on the second apex. Alternatively or additionally, a third spacer element can be arranged on the first valley bottom. A plurality of first, second or third spacer elements can naturally be provided on the packing layer.

Each packing layer can include a first marginal boundary and a second marginal boundary, wherein the first marginal boundary is arranged substantially parallel to the second marginal boundary. The spacer element can in particular be arranged in the proximity of the first marginal boundary and/or in the proximity of the second marginal boundary.

The structured packing has an improved stability with the same number or a lower number of contact points. The packing layer has corrugations to improve the stability, wherein the corrugation height is substantially constant.

In accordance with a preferred embodiment, at least a part of the apex is made as an edge and/or at least some of the corrugation valleys are made in V shape.

A structured packing thus includes a first packing layer in accordance with one of the preceding embodiments and a second packing layer, wherein the second packing layer has corrugations like the first packing layer, with the first packing layer and the second packing layer being arranged such that the channels of the first packing layer intersect with the channels of the second packing layer. The first packing layer is in touching contact with the second packing layer via the spacer elements.

The spacer elements can be arranged on each of the first and second packing layers. The spacer elements of the first packing layer can be in touching contact with the spacer elements of the second packing layer.

The spacer elements can in particular be arranged beneath one another with a vertical alignment of the first and second packing layers.

The spacing elements can be disposed next to one another with a vertical alignment of the first and second packing layers.

A packing layer in accordance with the invention is made of structured packing layers whose folds are all of equal height. A high stability of the packing is hereby produced which is in particular of special importance in columns with a large diameter. The number of the points of intersection between the individual packing layers is realized in accordance with the invention by the introduction of spacer elements between the packing layers. These spacer elements can be made as bars which are made, for example, of wires or of narrow sheet metal strips which are applied to the folded packing layers at specific points and thus separate the packing layers from one another at a defined interval and at defined points.

It appears even more advantageous to integrate the spacer elements into the packing layer and thus to have to carry out fewer process steps in the manufacture. For this purpose, the spacer elements can be worked out of the sheet metal by deep drawing at defined points, e.g. at the upper edge and lower edge of the packing layer. When the individual packing layers are placed over one another, the channels only contact one another at the spacer elements in a marginal region at the upper edge and lower edge of the packing layer and thus effect a considerable reduction of the contact points as well as a maximization of the wetted packing surface with simultaneous stability of the individual packing layers and thus also of the packing body which is made of a plurality of packing layers.

The packing layer in accordance with any one of the preceding embodiments can in particular be used for the absorption with an aqueous absorbent.

The apparatus for the purification of fluids includes a mass transfer apparatus which contains a more volatile fluid and a less volatile fluid which contains a structured packing, with the structured packing containing a first packing layer and a second packing layer, with the first packing layer and the second packing layer having corrugations, with open channels being formed by the corrugations, with the channels of the first packing layer crossing the channels of the second packing layer, with the channels being able to be flowed through by the less volatile fluid so that the channel can be wetted by the less volatile fluid as a film, the more volatile fluid being located within the film, with a purification either of the more volatile fluid or of the less volatile fluid being able to be carried out by a mass transfer between the more volatile fluid and the less volatile fluid. The first packing layer is in touching contact with the second packing layer via spacer elements.

The spacer elements are preferably made as bars. If now such spacer elements are provided, the spacing of adjacent packing layers can increase, in particular when the bars are located on apices which bound the open channels. An apex can be understood either as a corrugation peak or as an edge, that is, as a tip which is formed by two adjacent side surfaces of a channel. When the spacing between the packing layers increases, fewer packing layers can be arranged in the mass transfer apparatus if the total volume taken up by the packing should not be changed. It follows from this, however, that the total surface of the packing decreases.

This statement admittedly applies to the total surface. It has, however, been shown that this statement cannot be transferred to the mass transfer area for specific applications. The mass transfer takes place in a plurality of part steps running sequentially for the purification of a more volatile fluid, in particular of a gas. The components contained in the gas which have to be separated are transported to the interface of the liquid by diffusion. The components subsequently have to pass through the interface and be taken up in the liquid. A chemical reaction can in particular also take place in the liquid so that the components remain bound in the liquid and can be discharged with the liquid. If now the diffusion speed or the reaction kinetics in the liquid take up more time in comparison with the preceding part steps, this diffusion speed or the reaction kinetics represent the limiting factor for the total mass transfer. It is necessary to provide a mass transfer area for the liquid which is as large as possible so that the mass transfer can be improved. The gas-side mass transfer which is deteriorated due to the reduced number of intersection points does not play any decisive role for the mentioned liquid-controlled applications.

The spacer elements are in particular arranged in the marginal region of the first packing layer in the apparatus in accordance with any one of the preceding embodiments. In contrast to the prior art, in accordance with which a still uniform distribution of the contact points is desired, but the number of contact points is reduced, this uniform distribution of the contact points over the total surface is fully dispensed with in the invention. If the few contact points are thus placed together more tightly, the flow restriction effects a backflow behind the contact points, whereby the unwetted area behind the contact point is surprisingly reduced. Accordingly, few contact points with less unwetted surface and in sum a maximum ratio of mass transfer area to total surface result.

In accordance with an advantageous embodiment of the apparatus, the spacer elements are located on each of the packing layers. In this case, all the packing layers have the same structure, which reduces the manufacturing effort and/or cost. The packing layers can be manufactured continuously in this form in that a band is continuously folded and in the meantime the spacer elements are also produced. The folded band provided with spacer elements is cut to the desired dimensions. The band parts cut to size produce the packing layers, with each second packing layer being turned so that a cross-wise arrangement of packing layers arises when they are placed onto one another adjacent to one another.

Advantageously, the spacer elements are disposed beneath one another or next to one another with a vertical alignment of the packing layers. The spacer elements in particular form a row of contact points which extends either vertically or horizontally.

The corrugations have a constant corrugation height to improve the stability.

The apparatus is particularly preferably used in an absorption column or desorption column.

A method for the purification of fluids in a mass transfer apparatus which contains a structured packing includes the steps: supplying a less volatile fluid to the mass transfer apparatus; distributing the supplied less volatile fluid over the total surface; supplying a more volatile fluid into the mass transfer apparatus into a fluid inlet region; distributing the more volatile fluid in the gas inlet region over the total surface, with the more volatile fluid flowing in counterflow to the liquid; collecting the more volatile fluid which exits the packing in a fluid outlet region, with the structured packing containing a first packing layer and a second packing layer, with the first packing layer and second packing layer having corrugations with a constant corrugation height, with open channels being formed by the corrugations, with the channels of the first packing layer crossing the channels of the second packing layer, with the more volatile fluid flowing through the channels from the fluid inlet region in the direction of the fluid outlet region, with the less volatile fluid surrounding the more volatile fluid which flows through the channels and flowing along the channel walls. The first packing layer is in touching contact with the second packing layer via spacer elements so that a mass transfer takes place between the more volatile fluid and the less volatile fluid over the mass transfer area formed by the channels.

The purification takes place by the mass transfer which depends on the speed at which the components to be removed from the flow of the more volatile fluid are taken up by the less volatile fluid when the more volatile fluid should be purified or which depends on the speed at which the components to be removed from the less volatile fluid are released from the less volatile fluid when the less volatile fluid should be purified, that is stripping takes place.

The more volatile fluid is in particular a gas; the process can, for example, be used for the purification of a gas containing $CO_2$. The less volatile fluid is a liquid in which a chemical reaction can take place.

A maximum liquid wetting of the total surface is made possible in mass transfer apparatus by use of spacer elements and by an arrangement of the contact points.

The structured packing is preferably made of packing layers whose folds are all uniformly high. A high stability of the packing is hereby produced which is in particular of special importance in columns with a large diameter. The number of the contact points between the individual packing layers is realized in accordance with the invention by the introduction of spacer elements between the packing layers. These spacer elements can be made as bars which are made, for example, of wires or narrow sheet metal strips which are applied to the folded packing layers at specific points and thus separate the packing layers from one another at a defined interval and at defined points. The spacer elements can be produced by deep drawing or stamping from the metal of the packing layer or in that the corrugation layers and valley-like depressions between the desired positions of the spacer elements are deformed so that the fold height is lower.

The spacer elements are applied at defined points, e.g. at the upper edge and lower edge of the packing layer. When the individual packing layers are placed over one another, the channels only touch at the spacer elements in a marginal region at the upper edge and lower edge of the packing layer and thus effect a considerable reduction of the contact points as well as a maximization of the mass transfer area with a simultaneous stability of the individual packing layers.

The invention will be explained in the following with reference to the drawings. There are shown:

FIG. 3 illustrates a representation of a conventional packing layer while indicating the flow path of the less volatile fluid;

Figure 4:
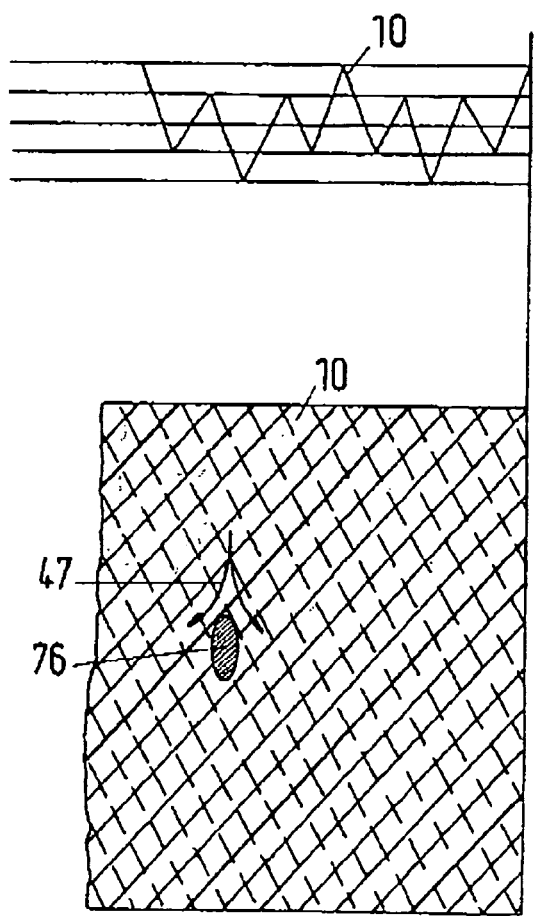
Figure 5:
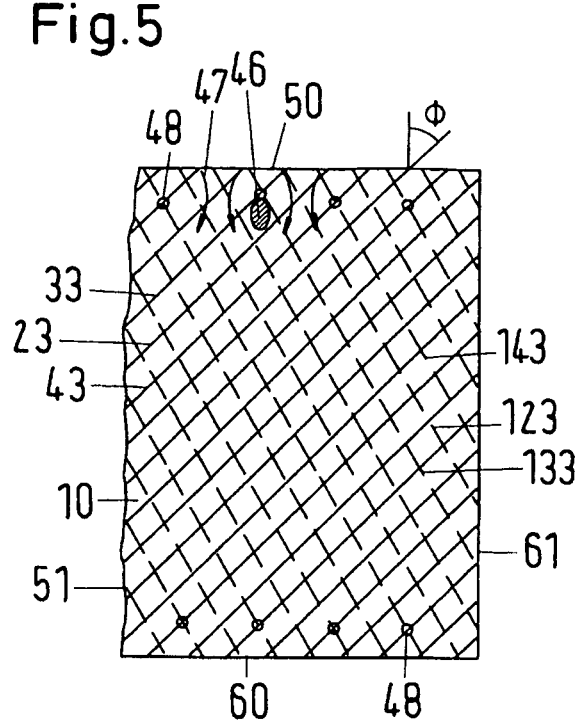
Figure 6:
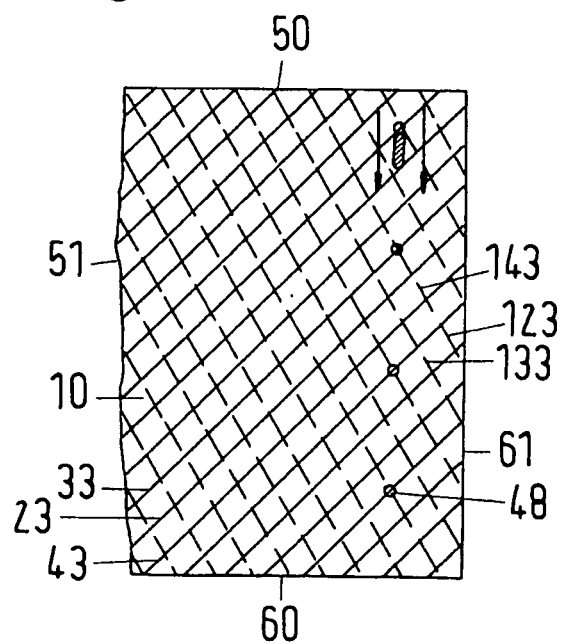
Figure 8A:
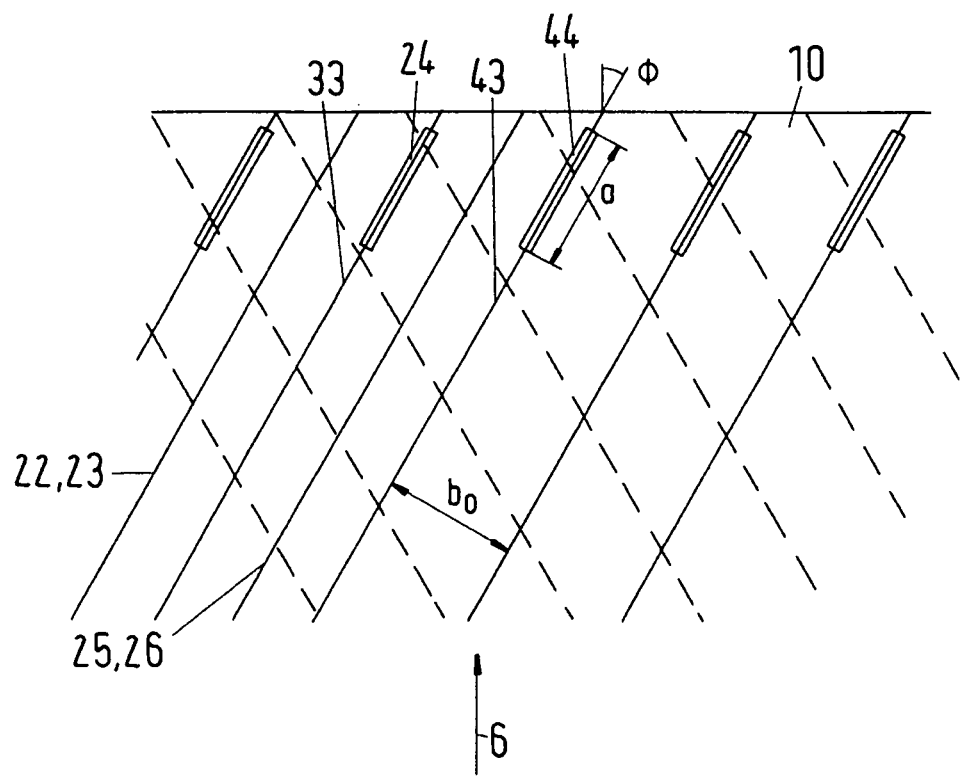
Figure 8B:
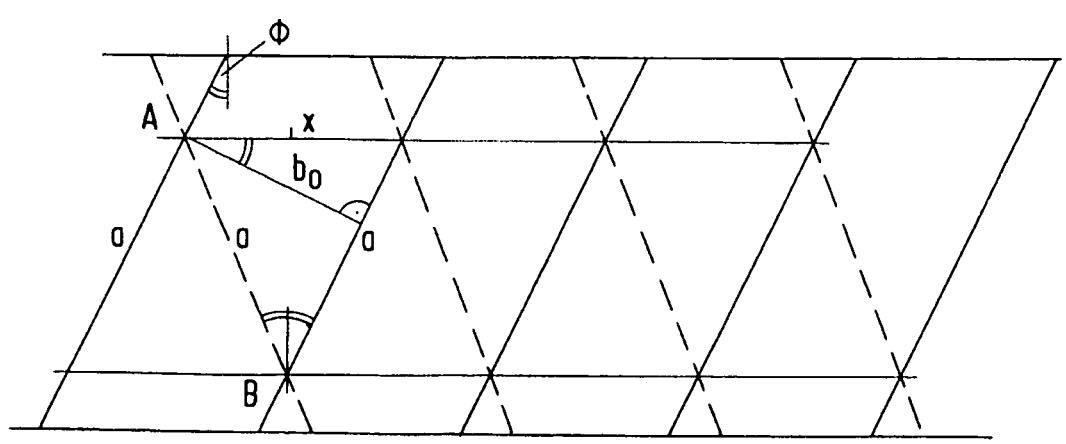
Figure 9A:
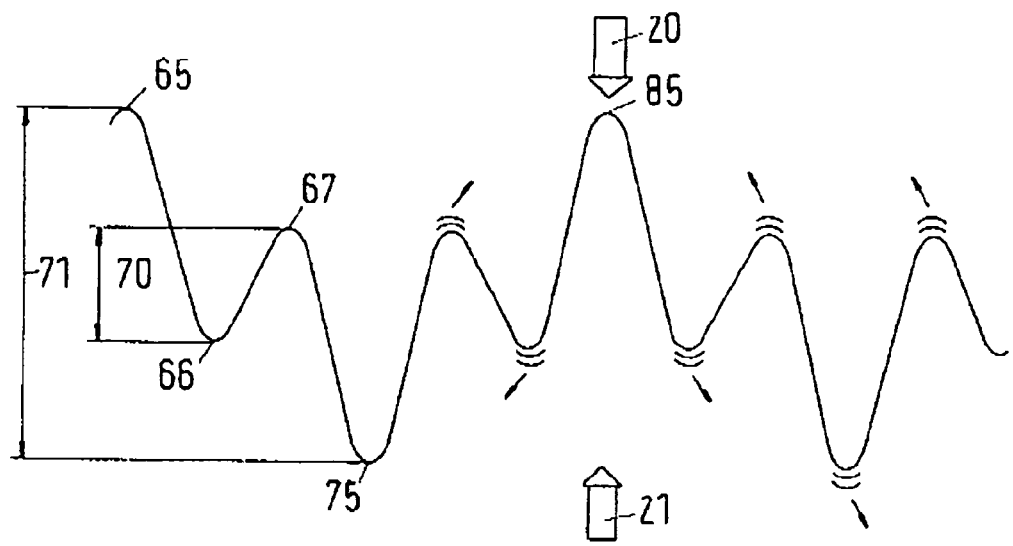
Figure 9B:
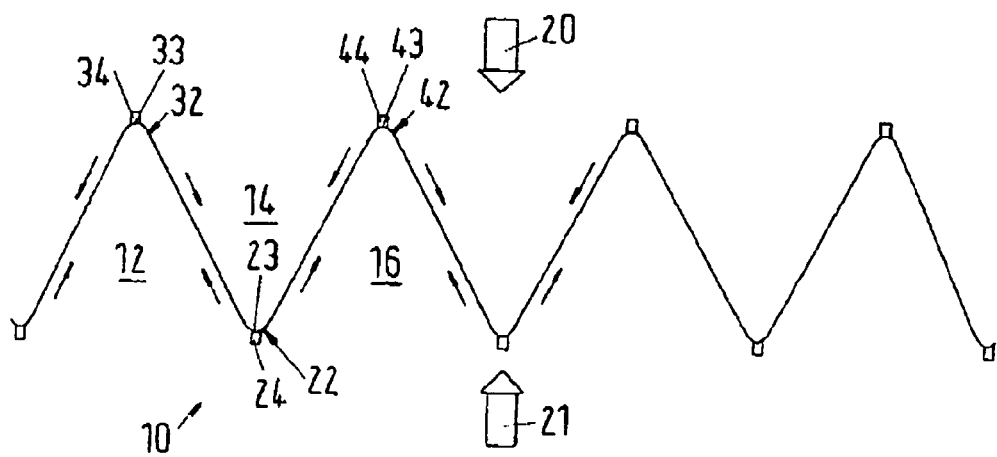
Figure 10:
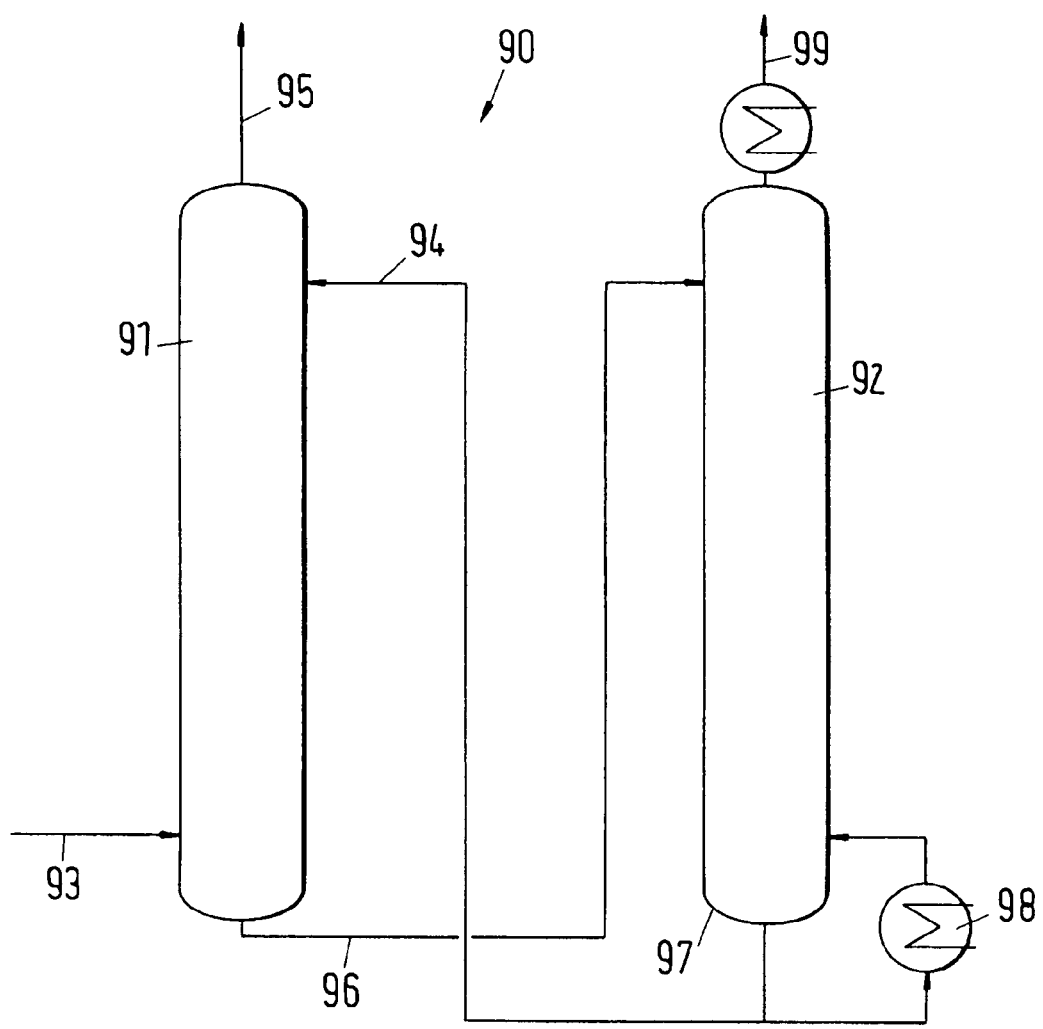

FIG. 4 illustrates a representation of the points of intersection in accordance with the solution of U.S. Pat. No. 6,378,332;

FIG. 5 illustrates a representation of the points of intersection of a first embodiment of the invention;

FIG. 6 illustrates a representation of the points of intersection of a further embodiment of the invention;

FIG. 7 illustrates a representation of a variant of the arrangement of the spacer elements in accordance with the invention;

FIG. 8a illustrates a representation with respect to the dimensions of the spacer elements;

FIG. 8b illustrates a representation of trigonometric relationships with respect to the embodiment of FIG. 8a;

FIG. 9a illustrates an illustration of the deformation of the packing in accordance with the prior art under transverse load;

FIG. 9b illustrates an illustration of the deformation of the packing in accordance with the invention under transverse load;

FIG. 10 illustrates a representation of an absorption system;

FIG. 11 illustrates a comparison of a packing with and without spacer elements for an absorption with mass transfer controlled at the liquid side.

Figure 1:
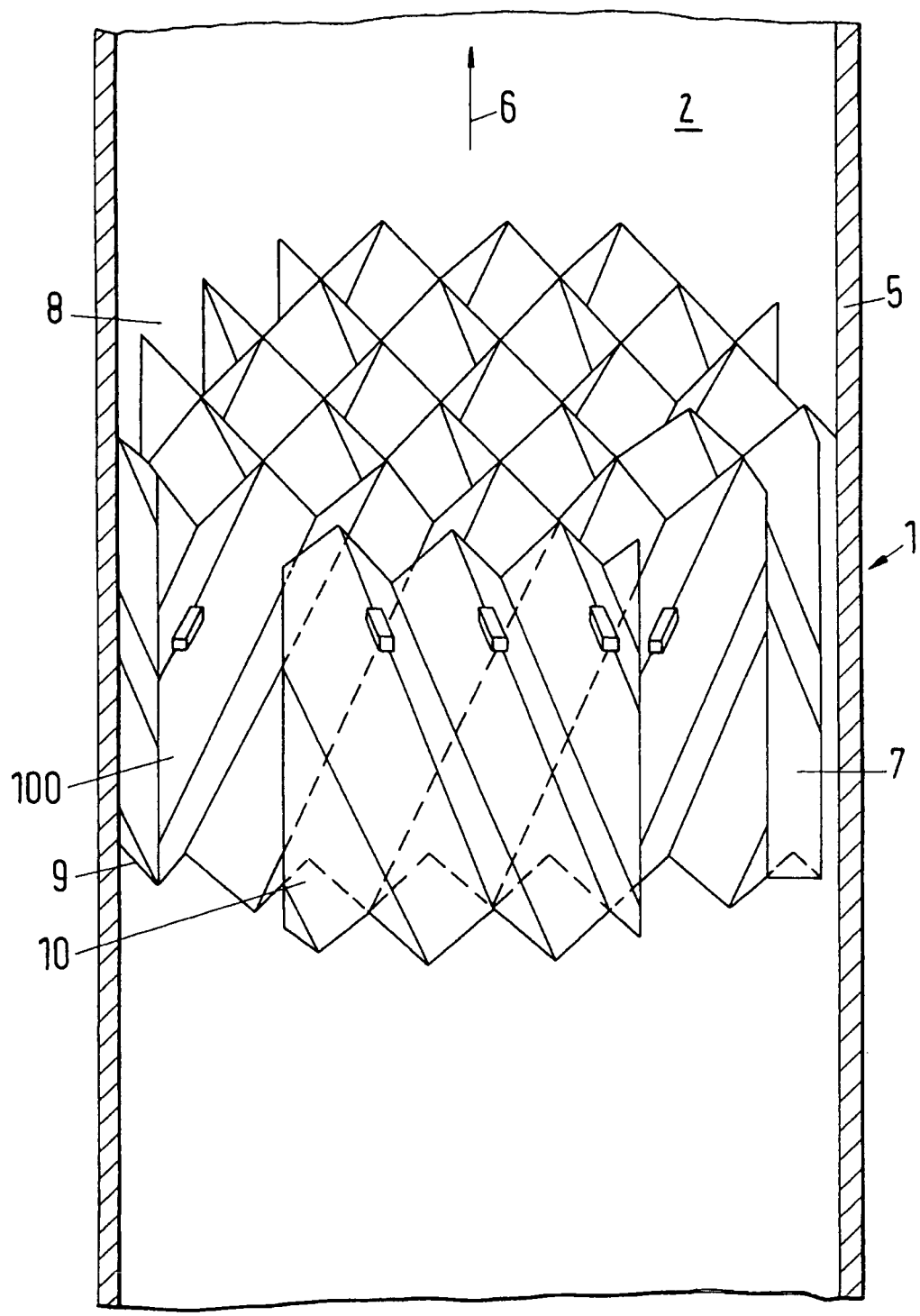
FIG. 1 illustrates a view of an apparatus in accordance with the invention including a plurality of packing layers.

Referring to FIG. 1, the apparatus 1 includes some packing layers of a structured packing 7 which form a packing body. A means for mass transfer between two fluid phases is understood as a structured packing 7. The structured packing 7 is used in a mass transfer apparatus 2. The mass transfer apparatus can in particular be made as a column 5.

The structured packing 7 is made of a plurality of packing layers which are in a regularly repeating geometrical relationship to one another. The spacing of adjacent packing layers can be selected as an example for this geometrical relationship. In accordance with the geometrical relationship, the spacings of adjacent packing layers from one another can periodically adopt the same value so that a structure arises from the sum of the packing layers which is characterized by the same or at least periodically the same spacings. The periodicity is found in the total structured packing, whereby the packing is given a regular structure. The structure can in particular be made as corrugations.

In contrast thereto, bulk-fill body packings are made of bulk-fill bodies, that is of elements of the same geometrical structure, with, however, each bulk-fill body being able to have any desired spacings from adjacent bulk-fill bodies so that a periodicity of these spacings is not recognizable. The bulk-fill bodies are introduced into the column as fill. They form a heap on a column base. The heap is characterized by the random arrangement of the individual bulk-fill bodies.

The packing layers in accordance with FIG. 1 are made of thin-walled elements which have corrugations. The corrugation section is characterized by a periodically repeating sequence of elevated portions, that is of corrugation peaks and valley-like depressions, that is corrugation valleys. These corrugations can in particular be made as a fold with a zigzag section with acutely converging edges. The packing layers are arranged with respect to one another so that the corrugations of two adjacent packing layers are inclined at an angle to the main direction of flow. The corrugations of adjacent packing layers are arranged cross-wise with respect to one another.

Figure 2A:
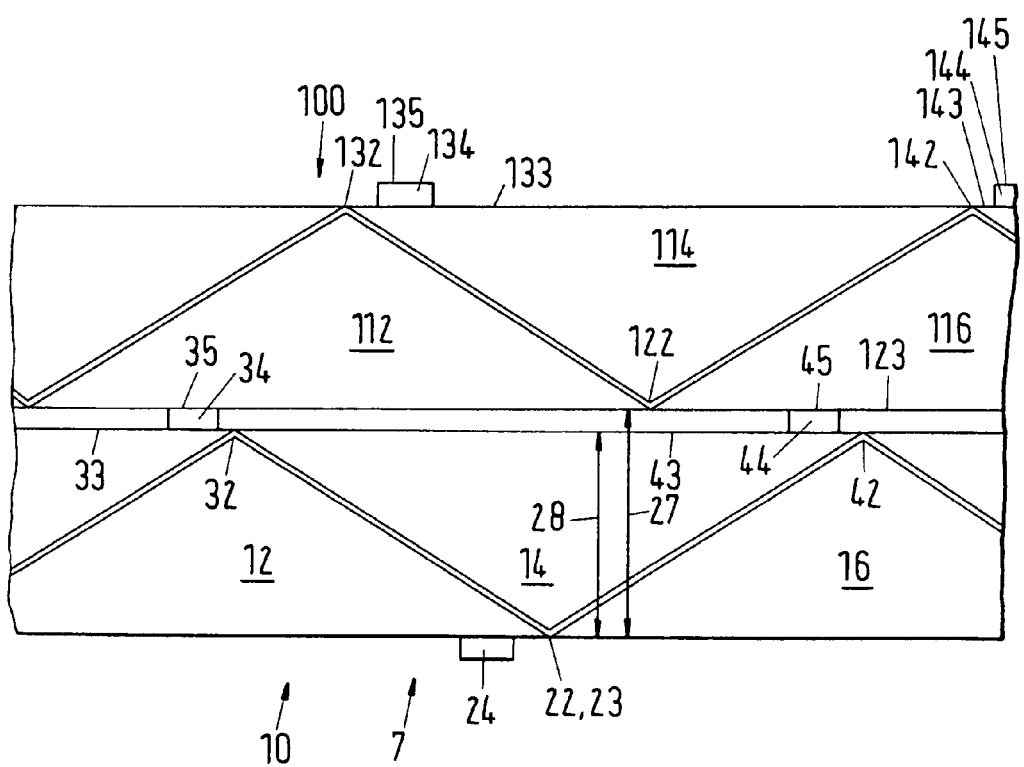
FIG. 2a illustrates a sectional representation through two adjacent packing layers in accordance with FIG. 1.

FIG. 2a shows two adjacent packing layers 10, 100 of the structured packing 7 in accordance with FIG. 1. A first packing layer 10 is arranged adjacent to a second packing layer 100. The first packing layer 10 and the second packing layer 100 can in particular include an element of sheet metal or of metal fabric; alternatively thereto, however, they can also include elements of plastic or of ceramic material. An element can in this respect include the total packing layer, but can also only form a part thereof. The element can have the form of a plate which includes corrugations, in particular a zigzag section or corrugations with rounded peaks and valley bottoms. The element can have coatings of plastics or ceramics to make the resistance of the packing layer toward chemical influences such as corrosion or thermal influences such as temperature or mechanical influences such as pressure more enduring.

The first packing layer 10 and the second packing layer 100 in FIG. 2a are shown in a view which shows a detail of the first surface 8 of the packing 7. The first surface 8 of the packing 7 is arranged substantially normal to the main direction of flow 6. The flow direction is called the main direction of flow 6 in which a more volatile fluid, in particular a gas, flows upwardly, that is in the direction of the head of the column 5, in the column 5 without installations. Alternatively to this, the opposite direction can also be defined as the main direction of flow. In this case, the main direction of flow corresponds to the direction in which a less volatile fluid, that is usually a liquid, flows through the column without installations, that is, in free fall. In the packing, the direction of flow locally deviates from the main direction of flow since the flow is deflected by the packing layers of the packing.

The first packing layer 10 of the structured packing 7 has corrugations, with a plurality of open channels 12, 14, 16 being formed by the corrugations. The channels include a first corrugation valley 22, a first corrugation peak 32 and a second corrugation peak 42. The first corrugation peak 32 and the second corrugation peak 42 bound the first corrugation valley 22. The first corrugation peak 32 and the second corrugation peak 42 have a first apex 33 and a second apex 43. A spacer element 44 extending in the direction of the second apex 43 and made as a bar is formed on the second apex 43 of the second corrugation peak 42. The first corrugation valley 22 has a valley bottom 23. The spacer element 44 has an edge 45 which has a larger normal spacing 27 from the valley bottom 23 of the corrugation valley 22 than the second apex 42 of the second corrugation peak 43 from the valley bottom 23 of the corrugation valley 22. The same applies to the edge 35 of the spacer element 34.

The normal spacing between the first apex 33 of the first corrugation peak 32 and the valley bottom 23 of the first corrugation valley 22 is called the corrugation height 28. The corrugation height 28 is accordingly smaller than the normal spacing 27. In a packing layer in accordance with this invention, the valley height 28 is in particular substantially constant, that is it is in the range of the usual tolerances which lie in the region of 0.5 mm.

A bar 34 can also be arranged on the first apex 33. A bar 24 can selectively also be arranged on the first valley bottom 23. A bar 44 can also be arranged on the second apex 42.

The second packing layer 100 of the structured packing 7 has corrugations, with a plurality of open channels 112, 114, 116 being formed by the corrugations. The channels include a first corrugation valley 122, a first corrugation peak 132 and a second corrugation peak 142. The first corrugation peak 132 and the second corrugation peak 142 bound the first corrugation valley 122. The first corrugation peak 132 and the second corrugation peak 142 have a first apex 133 and a second apex 143. A bar 134 extending in the direction of the first apex 133 is formed on the first apex 133 of the first corrugation peak 132. A bar 144 extending in the direction of the second apex 143 is formed on the second apex 143 of the second corrugation peak 142. The first corrugation valley 122 has a valley bottom 123. The bar 134 has an edge 133 and the bar 144 has an edge 145 which has a larger normal spacing from the valley bottom 123 of the corrugation valley 122 than the second apex 143 of the second corrugation peak 142 from the valley bottom 123 of the corrugation valley 122. At least a part of the apex can be made as an edge. At least some of the corrugation valleys can be made in V shape. The normal spacing between the valley bottom and the apex is essentially the same for all corrugation peaks of the packing layer in accordance with FIG. 2a.

Figure 2B:
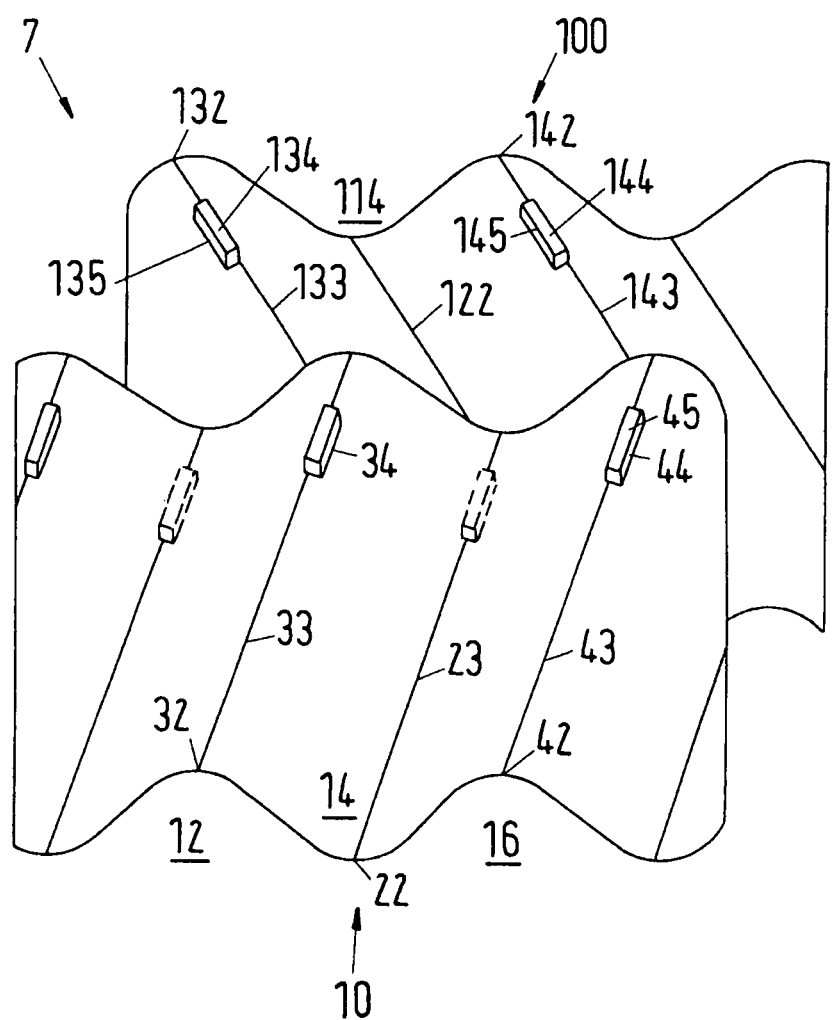
FIG. 2b illustrates a view of two adjacent packing layers with corrugations.

FIG. 2b shows two adjacent packing layers of a structured packing having corrugations according to which the apices do not form any acute edges, but are rather made as rounded portions. Reference is otherwise made to the description of FIG. 2a.

FIG. 3 shows the influence of the arrangements of the contact points on the mass transfer area, for example the packing layer 10 of the packing shown in FIG. 2a or FIG. 2b. FIG. 3a in this respect shows an arrangement in accordance with the prior art. The packing layer 10 covers the packing layer 100 which is not visible because it is behind it in the plane of the drawing. The first apex 33, the second apex 43 as well as the valley bottom 23 disposed therebetween are shown of the packing layer 10 by way of example. The first and second apices 33, 43 and the valley bottom 23 form fold edges. The apices 33, 43 lie on the valley bottom 23 which belongs to the packing layer 100. Each of the packing layers 10 and of the packing layers 100 naturally respectively contain a plurality of further apices and valley bottoms which are not designated in any more detail since they do not differ from the designated apices and valley bottoms. In FIG. 3, the lines belonging to the apices of the corrugation peaks are made thicker than the lines belonging to the valley bottoms. Furthermore, a long dashed line is provided for the apices of the corrugation peaks of the second packing layer 100 and a short dash dotted line for the valley bottoms of the packing layer 100. Contact points 48, which are marked by a circle in FIG. 3, arise at the points where a valley bottom of the packing layer 10 and an apex of the packing layer 100 meet. The contact points 48 are distributed uniformly over the total surface in the two shown packing layers 10, 100.

It can be seen from FIG. 3 that the contact points are disposed very closely to one another, whereby a very high number of small zones 46 not wetted by the less volatile fluid and thus a relatively small portion of mass transfer area to the total surface result. In FIG. 3, only one single zone 46 is shown; the arrows 47 symbolize the flow of the less volatile fluid.

FIG. 4 shows the case in which the contact points are reduced, for example by a fold of the packing layers such as is proposed in U.S. Pat. No. 6,378,332 B1. Considerably fewer, but in return also larger, unwetted zones 46 admittedly result overall due to the flow of the less volatile fluid symbolized by means of arrows 47. In sum, a small portion of mass transfer area at the total surface results. The geometrical shape of the packing layers in accordance with FIG. 4 will be looked at in detail in FIG. 9.

FIG. 5 shows an arrangement of the contact points 48 between two adjacent packing layers 10, 100 in accordance with the invention. The packing layer 100 is arranged behind the packing layer 10. Reference is made to FIG. 3 with respect to the representation. The number of contact points is reduced with respect to the surface of the packing layer 10. The contact points are in particular not distributed uniformly over the total surface.

The packing layer 10 includes a first marginal boundary 50 as well as a second marginal boundary 60, with the first marginal boundary 50 being arranged substantially parallel to the second marginal boundary 60. With a vertical alignment of the packing layer, the marginal boundary 50 spans an upper interface and the second marginal boundary 60 spans a lower interface. The packing layer 10 furthermore includes a first marginal boundary 51 and a second marginal boundary 61. The first marginal boundary 51 and the second marginal boundary 61 extend, with a vertical alignment of the packing layer in a packing; adjacent to the inner wall of the mass transfer apparatus, in particular the column, or along a segment border, with a further packing segment being adjacent thereto in large mass transfer apparatus. In mass transfer apparatus with large diameters, for example of 1 m and more, it has proven successful for the simplification of production and assembly to divide the packing into packing segments. A packing segment only extends over a part of the cross-sectional surface of the mass transfer apparatus. A plurality of these packing segments are arranged next to one another so that the sum of the packing segments covers the total cross-sectional surface of the mass transfer apparatus. The contact points 48 are arranged in the proximity of the first and/or second marginal boundaries 50, 51, 60, 61. The contact points preferably have spacer elements. These spacer elements can be made as an indentation or as a bar. A plurality of spacer elements which can have the same structure as one of the spacer elements 34, 44 in accordance with FIG. 2a or FIG. 2b is arranged in the proximity of the first marginal boundary 50, 51.

Alternatively or additionally, a plurality of spacer elements 24 can be arranged in the proximity of the second marginal boundary 60, 61. Spacer elements can naturally also be located in the proximity of at least one each of the first and second marginal boundaries.

In FIG. 6, a further variant is moreover shown in which the contact points are not arranged next to one another, but over one another. Here, too, a liquid flow down along the contact points effects a minimization of the unwetted areas between the contact points.

The horizontal arrangement of the contact points in accordance with FIG. 5 has the advantage that the unwetted zones cannot form behind the lower contact points close to the margin because the liquid is retained at the border between two packings disposed above one another. It is generally advantageous to position contact points in the proximity of the marginal boundary 50, 60, 51, 61 because here the wetting is already unfavorable due to other interfering influences. If, in contrast, the contact points are positioned in the interior of the packing layer, a further portion of the total surface is thereby poorly wetted which would otherwise remain without interference.

Referring to FIG. 7, wherein the packing layer 10 is shown in projection, the associated structured packing 1 includes the first packing layer 10 and a second packing layer 100, with the second packing layer 100 preferably having corrugations like the first packing layer 10. The first packing layer 10 and the second packing layer 100 are arranged such that the channels of the first packing layer 10 cross the channels of the second packing layer 100. The first packing layer 10 is in touching contact with the second packing layer 100 via at least one bar 24, 44. The bars are arranged on each of the first and second packing layers 10, 100. The bars are preferably arranged as in FIG. 5 or FIG. 6. The second packing layer 100 is not shown graphically in FIG. 7 for reasons of simplicity. The bars of the first packing layer 10 are in touching contact with the bars of the second packing layer 100. The bars 44, which are disposed in the proximity of the first marginal boundary 50, are preferably arranged such that they are made as elevated portions on a first side 11 of the packing layer 10. The bars 24, which are arranged in the proximity of the second marginal boundary 60, are made as elevated portions on a second side 13 of the packing layer 10. The first side 11 of the packing layer 10 is arranged opposite the second side 13 and forms a respective one surface of the packing layer.

The bars can in particular be arranged beneath one another with a vertical alignment of the first and second packing layers 10, 100. Alternatively to or in combination with this, the bars can be arranged next to one another with a vertical alignment of the first and second packing layers.

Other spacer elements which do not have be made as bars or not exclusively as bars can also be arranged along an apex of the packing layers 10, 100. Such a spacer element can be formed by any desired elevated portion which projects over the normal fold height. Fold height is understood as the spacing between a corrugation peak and an adjacent corrugation valley. If the corrugation valley has a finite curvature at its apex, the spacing is defined as the normal spacing of the two apex point tangents disposed parallel to one another. If the curvature is infinite, that is the apex is acute and the highest point thus has no clearly defined tangent, a plane is placed through the highest point which contains all apex points of a side of the packing layer. A plane is likewise placed through the lowest point of a corrugation valley which contains all the points of the corrugation valley and of further corrugation valleys. The two planes should be parallel to one another. It follows from this that the fold height is the normal spacing between the two planes. Such spacer elements extend over a part of the apex or of the edge. The spacer elements can be manufactured by deep drawing from the blank for the packing layer, for example from a packing metal sheet, or can be formed by placing on of a strand-shaped element, e.g. a wire element or a bar element, along the upper edge. The spacer elements are advantageously applied to one side on the apices of the corrugation peaks or of the valleys of the folds. The spacer elements preferably applied along the opposite or the same marginal region 50, 60.

The advantage of this arrangement is that a blank can be manufactured endlessly long. Such a blank can be made of band material, for example as a plate-like metal sheet. Subsequently, portions of specific length are cut from the band material. These portions are converted into corrugations, for example by a bending process. Alternatively to this, band material is used which already has corrugations. The portion cut to length and having the corrugations then forms the packing layer. A deep drawing procedure can be superimposed on these corrugations during the bending process so that the spacer elements are manufactured by deep drawing during the bending procedure. Alternatively, a production process is possible in which the regions between the bars are bent differently or are pressed down a little so that they have a different height to the bars. A first packing layer 10 and a second packing layer 100 are in turn placed over one another in a matching manner by turning all second corrugations. A respective row of spacer elements is located between all packing layers in the proximity of the upper and lower marginal boundaries and/or in the proximity of the lateral marginal boundaries.

FIG. 8 illustrates the determination of the length of a deep-drawn spacer element on an apex 33, 43 of the corrugations of the first packing layer 10. The apices 33, 43 are arranged inclined at an angle $\phi$ (phi) to the main direction of flow 6 and have a spacing $b_0$ from the first apex 33 to the second apex 43. The spacing $b_0$ can in particular be constant in this respect. The spacing $b_0$ is furthermore found between the first valley bottom 23 and the second valley bottom 26. In FIG. 8, the first valley bottom 23 coincides with the first corrugation valley 22 and the second valley bottom 26 coincides with the second corrugation valley 25. The length of a spacer element 24, 34, 44 is designated by "a" in FIG. 8. The length "a" is the longitudinal extent of the spacer element in the direction of the associated apex. The length "a" is preferably selected such that each apex of the first packing layer 10 has a point of intersection with an apex of the adjacent second packing layer 100 precisely where a spacer element is located. The spacer element of the packing layer 10 is in touching contact with a contact point of the apex of the second packing layer 100. The contact point can, but does not have to be, part of a spacer element of the second packing layer 100.

The relationship $a=b_0/\sin(2\phi)$ is obtained under the assumption that the angle of inclination phi ($\phi$) of the first packing layer is of the same magnitude as the angle of inclination of the second packing layer.

FIG. 8 is based on this assumption. The length of the spacer element a must be just so big that it crosses precisely one spacer element of the second packing layer or its corrugation peak. If therefore the point of intersection A is disposed just at the end point of the first spacer element, the point of intersection B is just a little outside the length a of the second spacer element. Since this infinitesimal difference cannot be shown in a drawing, two points of intersection were drawn for the first corrugation peak of the second packing layer in FIG. 8b.

If the second packing layer is moved horizontally to the left with respect to the position of the packing layers in FIG. 8b, the point of intersection A migrates along the length of the spacer element a up to the end of the spacer element disposed opposite the point A.

In the case shown, the second packing layer is disposed just so that the borderline case occurs in which a point of intersection with the spacer element is present at point A, but actually no point of intersection with the spacer element is present at point B. Since the angles of inclination of the two adjacent packing layers 10, 100 are of the same magnitude, the spacing AB along the apex of the corrugation peak of the second packing layer likewise corresponds to the length of the spacer element a.

Accordingly, the triangle ABC with the side lengths x, a, a is an isosceles triangle. It furthermore results that the angle spanned between the two sides a amounts to precisely $2\phi$. $b_0$, the wavelength, that is the normal spacing between two adjacent apices of corrugation peaks of the first packing layer, is likewise drawn. This triangle has to have a right angle and include the angle $2\phi$ at the edge B.

The desired relationship for a thus results while using the angle of inclination $\phi$ and the wavelength $b_0$, i.e. $a=b_0/\sin(2\phi)$.

The height of the spacer element preferably lies in the range from 10 to 30% of the layer height so that gaps result between the individual packing layers of just this value range. The gaps amount to a minimum of 1.5 mm for aqueous systems. Narrower gaps can be disadvantageous since liquid, in particular water, can be trapped between two adjacent edges, can remain there and can form a liquid bridge.

In FIG. 9a, a packing layer in accordance with a known construction shape having differently high folds for the reduction of the contact points is shown. The disadvantage of this construction shape is that, on loads on the upper side and lower side, with the arrows 20, 21 indicating the direction of force, the packing layer is compressed. The folds include a first apex 65 and a second apex 85 as well as a corrugation valley 75 disposed therebetween. The first and second apices 65, 85 can be in contact with an adjacent packing layer, not shown. An intermediate corrugation valley 66 and an intermediate corrugation peak 67, which form a fold, are disposed between the first apex 65 and the valley bottom 75. The intermediate corrugation valley 66 has an intermediate valley bottom 68 and the intermediate corrugation peak 67 has an intermediate apex 69. The normal spacing 70 between the intermediate valley bottom 68 and the intermediate apex 69 is smaller than the normal spacing 71 between the apex 65 and the valley bottom 75. The normal spacing 70 is approximately half as big as the normal spacing 71 in the embodiment shown in FIG. 9a. A half-height fold is thus formed by the intermediate corrugation valley 66 and the intermediate corrugation peak 67. The half-height fold serves as a crumple zone and can be deformed. On the one hand, no stable packing body can be built by this deformation; on the other hand, the observation of a fixed layer height of the packing is not possible. The layer height corresponds to the previously defined normal spacing 71.

This problem can be avoided by a construction shape in accordance with the invention. As FIG. 9b shows, a packing layer with spacer elements on each fold can be compressed much less and the packing layer can thus be exposed to higher loads on the upper side and lower side. This enables the design of stable packing bodies and ensures a substantially constant layer height.

FIG. 10 shows an absorption system 90. The absorption system 90 includes two mass transfer apparatus, an absorber 91 and a desorber 92 which are in particular made as columns. One or more components from a gas flow are separated in the absorber 91 in the absorption system. For this purpose, a liquid solvent or absorbent is used. In the desorber 92, the solvent or absorbent is purified from the components taken up.

Both absorption and rectification are separation processes to separate one or more components from an existing feed flow 93. Rectification is used to separate liquid mixtures on the basis of different boiling points of the individual components, with rectification to be understood as continuous distillation which in particular includes a plurality of separating stages. In absorption, in contrast, one or more components are separated from a gas flow with the help of a suitable solvent or absorbent 94 and are thus separated from the gas flow. The overhead product of the absorber 91 is thus a purified gas flow 95. The bottom product 96 of the absorber 91 is an absorbent or solvent loaded with the component or components. It can be sensible for economical, energetic or ecological reasons to purify the absorbent or solvent and to supply it again to the absorber as purified solvent or absorbent 94. The purification of the absorbent or solvent takes place in the desorber 92. The loaded absorbent or solvent, that is the bottom product 96 of the absorber, forms the feed flow of the desorber. This feed flow is supplied to the desorber as a liquid in accordance with FIG. 10. The desorber 92 can contain one or more packings in accordance with any one of the preceding embodiments. The loaded solvent or absorbent flows in the direction of the sump 95. The absorbent or solvent is evaporated at least partly in the sump, for which purpose a sump evaporator 98 is provided. The absorbent or solvent evaporated in the sump evaporator contains the components to be separated and absorbs the components to be separated during the rising in the column from the feed flow of the loaded absorbent or solvent flowing in the direction of the sump. A gaseous part flow 99 which is enriched with the components to be separated thus arises in the desorber. These components to be separated can be separated from the gaseous part flow 99 either thermally, that is by condensation, or via other downstream separation steps.

Alternatively or in addition to this, expansion apparatus can be provided if the desorber should be operated at a lower pressure than the absorber or compression apparatus if the desorber has to be operated at a higher pressure than the absorber.

The mass transfer between the gas and the liquid generally takes place on the basis of a temperature drop from the sump to the head in both directions in rectification. The fluid with a higher boiling point condenses from the gaseous phase and is taken up in the liquid and the fluid with a lower boiling point evaporates from the liquid phase into the gaseous phase. In absorption, the mass transfer only takes place in one direction; gas is absorbed by the liquid here.

The difference between rectification and absorption lies in the fact that the gas flow and the liquid flow are coupled to one another in rectification; in absorption, in contrast, both flows can be set independently of one another: in rectification a specific amount of liquid is evaporated and rises up the column in the direction of the column head. All the vapor is condensed at the column head and is conducted back into the column as a liquid flow again at least in part. The maximum conceivable liquid quantity would accordingly be the total condensed quantity of vapor which arrives at the column head. If more liquid is evaporated in the sump, more liquid can also flow back. Both flows are coupled to one another in this respect and the mass transfer depends decisively on the vapor flow. Rectification applications are accordingly controlled at the gas side as a rule.

In contrast to this, different operating conditions can be set in absorption applications with the help of pumps and fans: A large absorbent flow can be brought into contact with a relatively small gas flow or also vice versa. In addition, the absorbents can bind the gas components to them in different manners: physically, by a chemical reaction or both physically and chemically. In this respect, the selection of an absorbent or solvent for a specific gas component and the concentrations in the gas and the liquid are decisive for whether the mass transfer is controlled more at the gas side or more at the liquid side.

A prototype of a packing which contains spacer elements was manufactured to check the practicability of the packing in accordance with the invention: a few packing layers were removed from a conventional packing and the space which became free was homogenized by inserted spacer elements of the same thickness between the other packing layers. Each packing layer thus contains a fixedly defined spacing to the two adjacent packing layers, whereby a gap with a defined width results between all the packing layers. In the case examined, the width amounts to 1.5 mm. In addition, the number of contact points in the prototype reduces from 79,500 $m^{-3}$ to 18,000 $m^{-3}$ and the total surface from 205 $m^2/m^3$ to 190 $m^2/m^3$. The reduction of the total surface must be accompanied by a reduction in the separating capacity or in the efficiency of the packing, provided other measures do not make up this loss again. In accordance with U.S. Pat. No. 6,378,322 B1, embodiments are possible which show an advantageous separation effect in rectification despite the reduction of the total surface.

The above-mentioned prototype was first tested in a rectification application. The packing was installed for this purpose in a test column having 250 mm inner diameter and was measured using the test system chlorobenzene/ethylbenzene. The tests document what was previously presumed: due to the more open cross-sectional surface which arises due to the gaps, the pressure loss over the packing reduces slightly in comparison with a packing without spacer elements. The reduction of the total surface, in contrast, results in a reduction in the separating capacity. The packing with spacer elements has fewer separation stages per meter (NTSM: number of theoretical stages per meter) than without spacer elements. The points below the loading point, in this example below the F factor 3 $Pa^{0.5}$, are decisive for the comparison. The F factor is a measure for the mean gas speed in the empty column multiplied by the root from the density of the gas. The F factor is proportional to the kinetic energy of the gas. Loading point is understood as a point of increased gas-liquid interaction.

The corresponding NTSM values amount to 1.6/m for the packing with spacer elements and 1.7/m for the packing without spacer elements. The NTSM value is a characteristic for the separating capacity. The higher the NTSM value, the larger the separating capacity of the packing. The separating capacity was thus therefore not improved with respect to the total surface.

These current findings therefore indicate that the packing in accordance with the invention with reduced contact points and larger spacings between the packing layers admittedly reduces the pressure loss, but additionally also results in a reduction in the separating capacity in rectification. Consequently, such a packing is without use in rectification and thus differs fundamentally from the packing presented in U.S. Pat. No. 6,378,322 B1 which is obviously advantageous for rectification.

Surprisingly, it was found in further trials that there are mass systems for which the packing in accordance with the invention produces an improvement in the separating capacity per total surface. The main focus in this respect is on systems with a large surface tension—usually aqueous systems—which as a rule tend to a poor wetting of the total surface. Aqueous solutions are above all increasingly being used in absorption, said aqueous solutions only wetting the available surface completely as a liquid film at very high volume flows due to the high surface tension. A poor wetting of the total surface of the packing, in contrast, results in a reduction in the separating capacity. A structured packing should therefore have the following properties in an absorbent application: low pressure loss over the packing and provision of a total surface which is as large as possible, with it having to be wetted as completely as possible by the liquid.

The hypothesis why a reduction in the contact points results in an improved absorption capacity is therefore as follows: due to the poor wetting properties of the liquids used, zones are formed behind the contact points on the packing layer which are not wetted by the liquid at all. The total surface can thus not be wetted to the full extent by the liquid. The liquid is prevented from flowing on at the contact points, is retained and deflected to the sides. A similar phenomenon can also be observed when water flows down a planar surface as a film and the flow is suddenly disturbed by an object introduced (e.g. a finger placed on the plane). The film flow opens up behind the object and a dry, not wetted surface arises which is only wet again when the object is removed from the flow.

The examined mass system is an aqueous system controlled at the liquid side. $CO_2$ which is in the ambient air is absorbed and chemically bound by caustic lye. The chemical reaction in the liquid takes place so fast in this respect that the absorption is in principle restricted to the interface between the gas phase and the liquid phase. This means that the portion of mass transfer area in the total surface is of decisive importance here. All other mechanisms only play a subordinate role.

With suitable correlations (cf. Duss et al.: "Effective Interfacial Area and Liquid Hold-up of Nutter Rings at High Liquid Loads", Chemical Engineering & Technology 24 (7), 2001 pp. 716-723), the effectively available mass transfer area can be determined directly from the measurement results obtained. As FIG. 11 shows, the packing with spacer elements and a reduced number of contact points results in a greater mass transfer area than the packing without spacer elements and with a large number of contact points despite the smaller total surface. This means that the separating capacity in mass systems controlled at the liquid side can actually be improved by a reduction of the contact points and a suitable arrangement of the contact points. The pressure loss can equally be reduced by the use of spacer elements and the amount of material can be decreased because a smaller number of packing layers is required. The lower curve of FIG. 11 shows the mass transfer area for a commercial structured packing of the type Mellapak® structured packing with an increasing load of the mass transfer apparatus with less volatile fluid, with the load L being entered on the x axis in $m^3/m^2$ h. The upper curve of FIG. 11 shows in the comparison thereto the mass transfer area relative to the total surface for a structured packing in accordance with the invention. It results for all measured points considered that the above ratio is larger using a packing with spacer elements than for a packing without spacer elements.

Such systems are primarily used in the absorbent preparation of exhaust gases in which problematic components should be removed from the exhaust gas flow with the help of reactive, aqueous solutions. The absorption of environmentally harmful $CO_2$ from power station exhaust gases with the help of aqueous absorbents which can contain organic or inorganic basic substances such as MEA or potash is an example here.

In such mass systems, the packing with a reduced number of contact points shows a significant reduction of the pressure drop as well as surprisingly an increase in the separating capacity with respect to comparable packings with a large number of contact points and without gaps between the packing layers.

The packing is thus very well suited to be used in particular in the absorption of $CO_2$ from power station exhaust gases using basic, aqueous solutions.

The invention thus provides a structured packing which reduces the pressure loss and is particularly suitable for absorption applications using an aqueous absorbent to absorb a gas, such as $CO_2$, from flue gas.

What is claimed is:

1. A structured packing comprising
at least a first packing layer having first corrugations forming a plurality of open channels, said channels including a first corrugation valley, a first corrugation peak and a second corrugation peak, wherein said first corrugation peak and said second corrugation peak bound said first corrugation valley, said first corrugation peak having a first apex, said second corrugation peak having a second apex and said first corrugation valley having a valley bottom;
a spacer element extending in the direction of said first apex formed on said first apex of said first corrugation peak and having an edge which has a larger normal spacing from said valley bottom than said first apex from said valley bottom; and
a second packing layer disposed in contact with said spacer element and spaced from said first packing ,layer, said second packing layer having second corrugations disposed in cross-wise manner relative to said first corrugations of said first packing layer.

2. A structured packing in accordance with claim 1 further comprising a second spacer element arranged on said second apex.

3. A structured packing in accordance with claim 2 further comprising a third spacer element is arranged on said first valley bottom.

4. A structured packing in accordance with claim 1 further comprising a first marginal boundary along an upper edge of said first packing layer and a second marginal boundary parallel to said first marginal boundary and along a lower edge of said first packing layer.

5. A structured packing in accordance with claim 4 wherein said spacer element is arranged in the proximity of one of said first marginal boundary and said second marginal boundary.

6. A structured packing in accordance with claim 1 wherein the corrugation height of each of said first corrugations is constant.

7. A structured packing in accordance with claim 1 wherein at least a part of each respective apex is made as an edge.

8. A structured packing in accordance with claim 1 wherein said corrugation valley of at least one of said open channels is made in V shape.

9. A structured packing in accordance with claim 1 further comprising a plurality of said spacer elements disposed on said first packing layer and a plurality of said spacer elements disposed on said second packing layer.

10. A structured packing in accordance with claim 9 wherein said spacer elements of said first packing layer are in touching contact with said spacer elements of said second packing layer.

11. A structured packing in accordance with claim 9 wherein said spacer elements of said first packing element are arranged beneath said spacer elements of said second packing element relative to a vertical alignment of said first and said second packing layers.

12. A structured packing in accordance with claim 9 wherein said spacer elements of said first packing layer are disposed next to said spacer elements of said second packing layer.

13. A mass transfer apparatus comprising
a column; and
at least one structured packing in said column, said structured packing having at least a first packing layer having first corrugations forming a plurality of open channels, said channels including a first corrugation valley, a first corrugation peak and a second corrugation peak, wherein said first corrugation peak and said second corrugation peak bound said first corrugation valley, said first corrugation peak having a first apex, said second corrugation peak having a second apex and said first corrugation valley having a valley bottom; a spacer element extending in the direction of said first apex formed on said first apex of said first corrugation peak and having an edge which has a larger normal spacing from said valley bottom than said first apex from said valley bottom; and a second packing layer disposed in contact with said spacer element and spaced from said first packing layer, said second packing layer having second corrugations disposed in cross-wise manner relative to said first corrugations of said first packing layer.

14. A mass transfer apparatus as set forth in claim 13 wherein said column has a liquid inlet region for introducing an aqueous absorbent for wetting said corrugations of each of said first packing layer and said corrugations of said second packing layer with a descending film of the aqueous absorbent; and gas inlet region for passing an ascending flow of an exhaust gas containing $CO_2$ through said first packing layer and said second packing layer in mass exchange relation with said descending film for absorption of $CO_2$ into said aqueous absorbent from said film.

15. A structured packing comprising
a plurality of packing layers, each said packing layer being disposed in parallel spaced apart relation to an adjacent one of said plurality of packing layers and each said packing layer having a plurality of corrugations of equal height extending in criss-crossing relation to said corrugations of an adjacent packing layer; and
a plurality of spacer elements spacing said packing layers apart, each said spacer element being disposed between a respective corrugation of one of said packing layers and a corrugation of an adjacent packing layer of said plurality of packing layers.

16. A structured packing as set forth in claim 15 wherein at least some of said spacer elements are bars.

* * * * *